Feb. 6, 1945.   I. E. McGEHEE   2,368,936
TRAILER
Filed March 30, 1942   3 Sheets-Sheet 1

Inventor
IRA E. McGEHEE
By
E. V. Hardway
Attorney

Feb. 6, 1945.  I. E. McGEHEE  2,368,936
TRAILER
Filed March 30, 1942  3 Sheets-Sheet 2
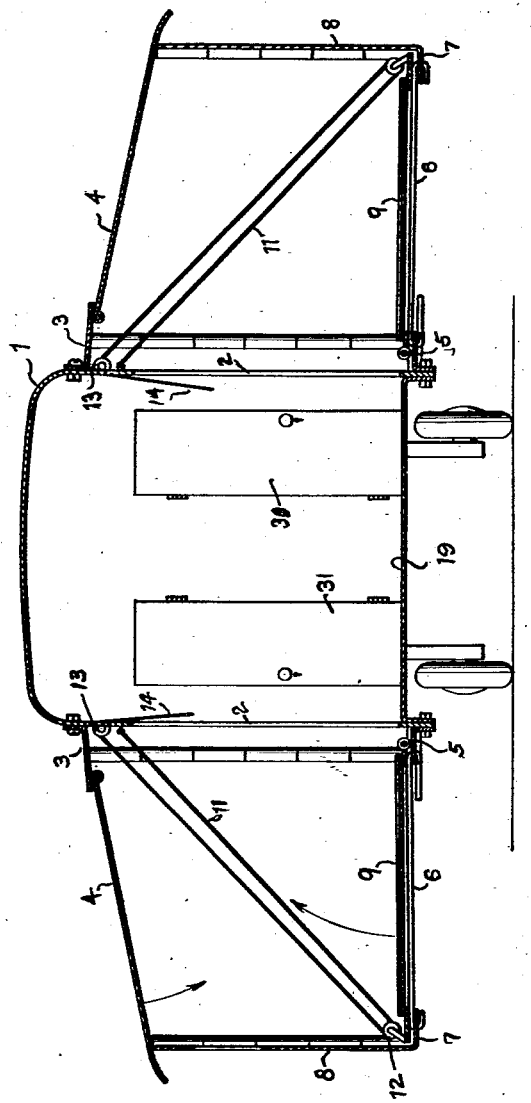
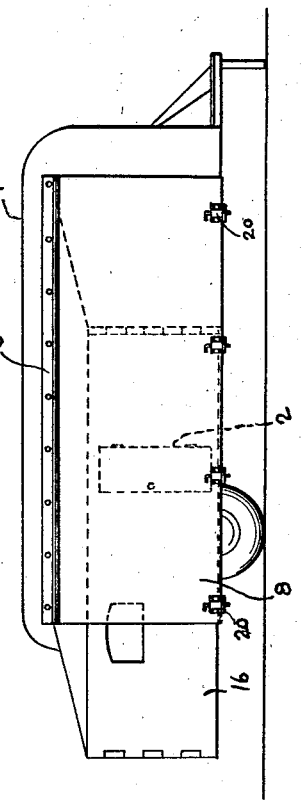
Inventor
IRA E. McGEHEE
By
E. V. Hardway
Attorney Feb. 6, 1945.  I. E. McGEHEE  2,368,936
TRAILER
Filed March 30, 1942   3 Sheets-Sheet 3
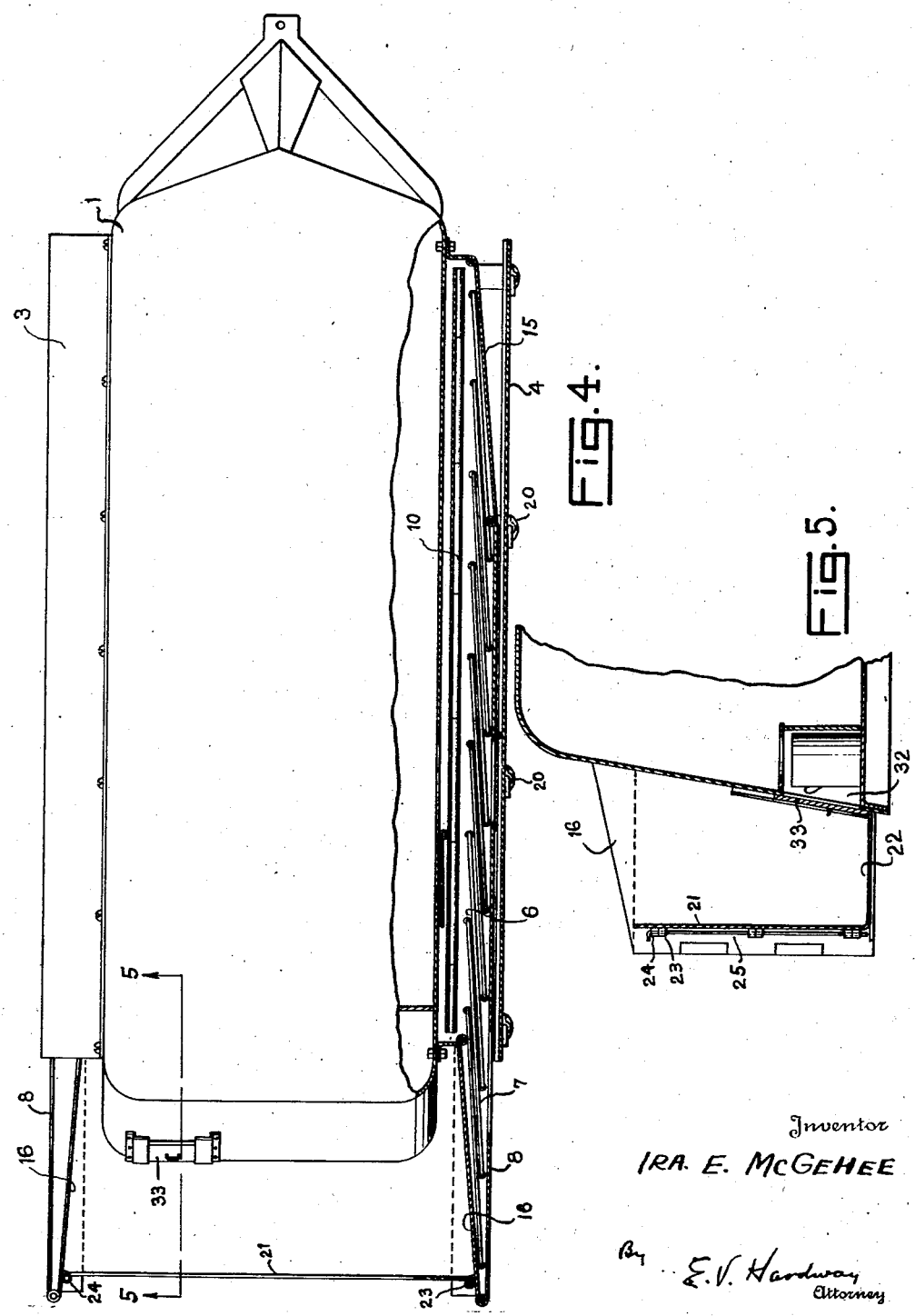
Inventor
IRA. E. McGEHEE
By E. V. Hardway
Attorney Patented Feb. 6, 1945

2,368,936

UNITED STATES PATENT OFFICE 2,368,936

TRAILER

Ira E. McGehee, Crosby, Tex.

Application March 30, 1942, Serial No. 436,922

8 Claims. (Cl. 296—23)

This invention relates to a trailer.

An object of the invention is to provide a trailer of the character described having a central permanent body of a shape and size which will be convenient for towing behind an automobile. The invention also embodies the provision of a novel side wall structure which, when the trailer is stationary, may be extended in order to substantially increase the overall floor space of the extended trailer.

The invention contemplates a type of trailer which may be readily towed along a roadway with the extensible portions compactly folded against the sides of the permanent central portion and which may be used for transporting equipment, supplies or merchandise of any character and which, in case of necessity, may also be used for transporting persons. The trailer is consequently well adapted for military purposes and the extended sides of which may be used, if desired, for sleeping quarters, living quarters or for like purposes.

It is another object of the present invention to provide a trailer of the character described whose sides, when folded together, will be very compact and completely enclosed with means for conveniently extending said sides to their extended position for use and for readily collapsing the extensible portions into compact relationship with the sides of the central portion.

Another object of the present invention is to provide a trailer of the character described which will be provided with an extra, or auxiliary, baggage carrier when the extensible sides are in collapsed position.

With the above and other objects in view, the invention has particular relation to certain novel features of construction, arrangement of parts and use, an example of which is given in this specification and illustrated in the accompanying drawings, wherein:

Figure 2 shows a vertical, sectional view taken on the line 2—2 of Figure 1.

Figure 3 shows a side elevation showing the side extensions in collapsed position.

Figure 4 shows a plan view, partly in section, showing the side extensions collapsed.

Figure 5 shows a fragmentary, vertical, sectional view taken on the line 5—5 of Figure 4.

Figure 1:
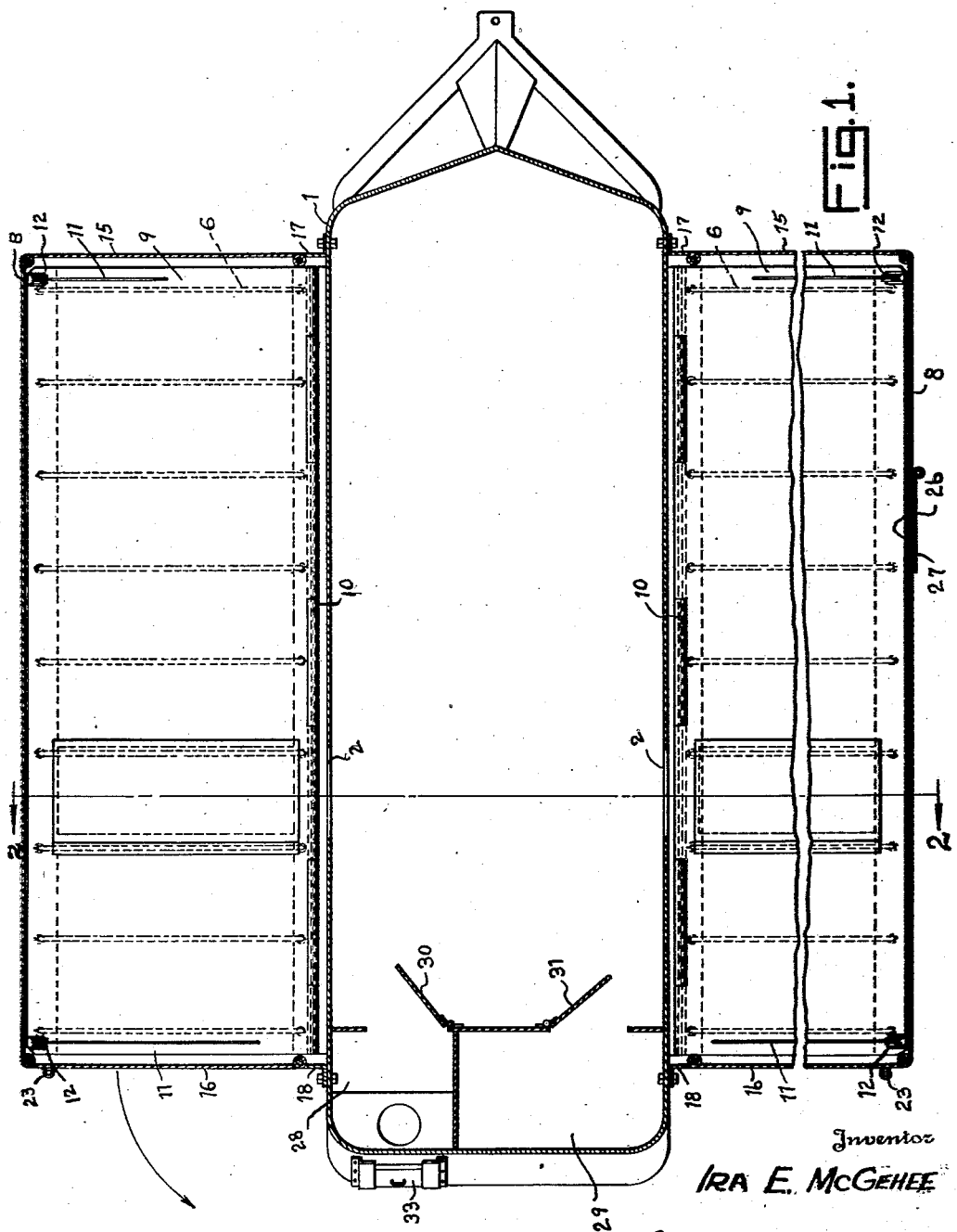
Figure 1 shows a horizontal, sectional view of the trailer with its side extensions shown in extended position.

Referring now more particularly to the drawings wherein like numerals of reference designate the same parts in each of the figures, the numeral 1 designates the central permanent body portion of the trailer which may be constructed of any conventional shape. As shown in the present illustration, the sides of this central portion have the door openings 2, 2.

Arranged above the door openings and extending approximately from end to end of the body 1, are the ledges 3, 3, said ledges forming part of the roofs of the side extensions hereinafter referred to. There are the hinged roofs or coverings 4, 4, hinged to the outer margins of the longitudinal ledges 3, 3, underneath and which, when extended, complete the roof portions of the side extensions as shown in Figure 2. Beneath the door openings 2, 2, and extended outwardly from the body portion 1, are the ledges 5, 5 which extend approximately from end to end of the body 1.

On each side are the series of floor supporting rods 6 which are pivotally connected at their inner ends to the corresponding ledges 5 and at their outer ends to the inwardly turned lower margins 7 of the vertical outer walls 8 of the respective side extensions.

On each side there is a floor 9, one for each extension. These floors are hinged, at their inner margins, on the corresponding ledges 5 by means of hinges as 10 so that the floors may be swung upwardly into vertical position alongside the side walls of the permanent body portion or swung downwardly into horizontal position onto the corresponding series of transverse supporting rods 6, as shown in Figures 1 and 2.

At the front and rear ends of the trailer are the cables 11, 11. These cables are attached at one end to corresponding side walls of the central body portion and pass around the sheaves 12, 12 carried by the outer edges of the floors 9 and also around the sheaves 13, 13 carried by the side walls of the body 1 and their free ends 14 are accessible inside of the body. By suitable manipulation of the cables, the floors may be swung upwardly into collapsed position alongside the body.

The side extensions have the end walls 15, 16. At their outer margins, these end walls are pivotally connected to the corresponding ends of the side walls 8 and at their inner margins, they are pivotally connected to the vertical hinge members 17, 18, which, in turn, are secured to the sides of the body 1 at the front and rear ends, respectively thereof.

When the side extensions are in extended position, the outer margins of the roof portions 4, 4 will rest upon the upper margins of the walls 8, 8 and the upper margins of the end walls 15, 16 are shaped to fit closely underneath the roofs of said extensions so as to form close fitting end enclosures for the side extensions. The central body portion is provided with a suitable floor 19.

When the side extensions are collapsed, the floors 9 will first be swung upwardly closely against the sides of the main body 1 and the walls 8 will be then moved rearwardly as indicated by the arrow in Figure 1 thus folding the ends 15, 16 and the intervening side walls 8 into collapsed position closely alongside said floors 9. As the ends 15, 16 and the intervening wall 8 move to collapsed position they swing on vertical axes and as they move inwardly and rearwardly toward the adjacent sidewall of the trailer body they maintain a parallelogram relationship therewith until collapsed thereagainst and the hinged roofs 4 are then swung downwardly into the position shown in Figure 3 and latched in that position by means of the latches 20, as shown in Figures 3 and 4. When in this collapsed position, it is obvious that the rear ends of the side walls 8 and the rear walls 16 will project rearwardly of the main body 1, as shown in Figures 4 and 5. These rear extensions form the sides of a baggage carrier. This baggage carrier is completed by the insertion of a vertical wall 21 whose lower end is overturned forwardly forming the floor 22, thus completing the auxiliary baggage carrier which is open at the top. The walls 16 have the vertically aligned eyes 23 arranged in staggered relation with similar vertically aligned eyes 24 on the wall 21 and locking rods 25 may be inserted through these aligned eyes, as shown in Figure 5 so as to lock the parts of the baggage carrier together.

When it is desired to extend the side extensions the rods 25 may be withdrawn and the part 21, 22 removed for storage at any convenient place about the trailer. The hinged roofs 4 may then be unlatched and raised and the walls 15, 8, 16 moved into the extended position shown in Figures 1 and 2 and in this position they will support said roof sections 4. The floors 9 may then be lowered onto the corresponding series of rods 6, which will form firm supports therefor.

As will be noted from an inspection of Figure 1, the side walls 8 have the door openings 26 with the doors 27 hinged to the walls 8 for opening and closing said openings for access to the interior of the side compartments and access may be had from these to the central body portion through the door openings 2. The interior of the main body 1 may be of any desired arrangement. As is shown in Figure 1, it has the rear end compartments 28 and 29 with the doors 30, 31 for closing said compartments or for gaining access thereto.

The main body is also provided with a rear compartment 32 for carrying supplies and the like which is accessible from the rear of the body but which is normally closed by a vertically slidable door 33.

The drawings and description are illustrative merely of the broad principle of the invention which will be defined by the appended claims.

What I claim is:

1. A trailer comprising, in combination, a central body section having vertical side walls; an extensible side section; said side section including end walls hinged to the central section to move on vertical axes, an outer side wall whose ends are hinged to the outer margins of the end walls to pivot on vertical axes whereby the side and end walls may be moved into collapsed position in a parallelogram relationship with the corresponding side wall of the body section, transverse floor supporting means pivotally connected to the central body section and to said outer side wall, to move with the wall into extended or collapsed position a unitary floor whose inner margin is hinged to the central body section on a horizontal axis to permit the floor to be folded alongside the central body section, a roof provided to cover the extensible side section when the latter is extended, said roof being hinged to the central body section on a horizontal axis to allow said roof to be swung into vertical position.

2. A trailer comprising, in combination, a central body section having vertical side walls; an extensible side section; said side section including end walls hinged to the central section to move on vertical axes, an outer side wall whose ends are hinged to the outer margins of the end walls to pivot on vertical axes, whereby said end walls and outer side wall may be moved into collapsed position alongside, and in parallelogram relationship with, the central body section, a floor whose inner margin is hinged to the central body section on a horizontal axis to permit the floor to be folded alongside the central body section, parallel with the collapsed side and end walls and a roof provided to cover the extensible side section when the latter is extended.

3. A trailer comprising, in combination, a central body section; an extensible side section; said side section including end walls hinged to the central section to move on vertical axes, an outer side wall whose ends are hinged to the outer margins of the end walls to pivot on vertical axes, the walls of the extensible side section being foldable alongside the central section and in parallelogram relationship therewith, a unitary floor for the extensible body section, and a roof provided to cover the extensible side section when the latter is extended.

4. A trailer comprising, in combination, a central body section; an extensible side section; said side section including a floor hinged to the central section to move on a horizontal axis to allow the floor to be swung into vertical position alongside the central body section, end walls hinged to the central section to move on vertical axes, an outer side wall whose ends are hinged to the outer margins of the end walls to pivot on vertical axes whereby said end walls and outer side wall may be moved, simultaneously rearwardly and inwardly, into collapsed position alongside the floor when the latter is swung into vertical position, a roof provided to cover the extensible side section when the latter is extended, said roof being hinged to the central body section on a horizontal axis to allow the roof to be swung into vertical position alongside the collapsed side and end walls, and lifting means accessible from within the central body section for swinging the floor into vertical position.

5. A trailer comprising, in combination, a central body section having vertical side walls; an extensible side section; said side section including a floor hinged to the central section to move on a horizontal axis to allow the floor to be swung into vertical position alongside the central body section, end walls hinged to the central section to move on vertical axes, an outer side wall whose ends are hinged to the outer margins of the end walls to pivot on vertical axes whereby said end walls and outer side wall may be moved, simultaneously rearwardly and inwardly, into collapsed position alongside the floor when the latter is swung into vertical position, floor supporting means pivoted to the central body section and to said outer wall section, and movable into position to support the floor when the side section walls are moved to extended position, a roof provided to cover the extensible side section when the latter is extended, said roof being hinged to the central body section on a horizontal axis to allow the roof to be swung into vertical position alongside the collapsed side and end walls, and means for latching the roof in said vertical position to maintain the extensible side section collapsed.

6. A trailer comprising, in combination, a central body section; an extensible side section on each side of the central body section; each side section including a floor whose inner margin is hinged to the central body section to allow the floor to be swung into vertical position and also including end walls hinged to the central section to move on vertical axes and an outer side wall whose ends are hinged to the outer margin of the end walls to pivot on vertical axes whereby said end walls and outer side wall of each extensible side section may be collapsed into position alongside the corresponding floor when the latter is in vertical position with the collapsed end and side walls projecting rearwardly of the central body section to form the sides of a baggage compartment, floor supporting means pivotally connected to the central body section and to said outer side walls, a roof provided to cover each extensible side section when the latter are extended, said roofs being hinged to the central body section on a horizontal axis to allow said roofs to be swung into vertical position against said collapsed extensions and a removable rear wall and bottom for said baggage compartment.

7. A trailer comprising a body section having a vertical side wall; an extensible side section including end walls and an outer side wall, said end walls having their inner margins pivoted on vertical axes to the side wall of the body section and having their outer margins pivoted on vertical axes to the outer side wall whereby both end walls and the outer side wall may be moved longitudinally and inwardly of the body section into collapsed parallelogram relationship with the side wall of the body section.

8. A trailer comprising a body section having a vertical side wall; an extensible side section including end walls and an outer side wall, said end walls having their inner margins pivoted on vertical axes to the side wall of the body section and having their outer margins pivoted on vertical axes to the outer side wall whereby both end walls and the outer side wall may be moved longitudinally and inwardly of the body section into collapsed parallelogram relationship with the side wall of the body section; a floor whose inner margin is pivoted to the body section to swing on a horizontal axis and a roof hinged to the body section to pivot on a horizontal axis whereby the roof and floor may be swung into collapsed position in parallelogram relationship with the side wall of the body section.

IRA E. McGEHEE.